United States Patent
Jaiswal et al.

(10) Patent No.: US 11,120,455 B2
(45) Date of Patent: Sep. 14, 2021

(54) INTELLIGENT CHANNEL STEERING BASED ON DYNAMICALLY DETERMINED INTENTS DURING CHANNEL INTERACTIONS

(71) Applicant: PAYPAL, INC., San Jose, CA (US)

(72) Inventors: Khushboo D. Jaiswal, Cedar Park, TX (US); Swati Baradia, Omaha, NE (US); Rahul Nair, Leander, TX (US)

(73) Assignee: PAYPAL, INC., San Jose, CA (US)

( * ) Notice: Subject to any disclaimer, the term of this patent is extended or adjusted under 35 U.S.C. 154(b) by 264 days.

(21) Appl. No.: 16/220,730

(22) Filed: Dec. 14, 2018

(65) Prior Publication Data

US 2020/0193447 A1 Jun. 18, 2020

(51) Int. Cl.
G06Q 30/00 (2012.01)
H04M 3/51 (2006.01)

(52) U.S. Cl.
CPC ........ G06Q 30/016 (2013.01); H04M 3/5166 (2013.01); H04M 3/5175 (2013.01); H04M 3/5191 (2013.01)

(58) Field of Classification Search
CPC combination set(s) only.
See application file for complete search history.

(56) References Cited

U.S. PATENT DOCUMENTS

| | | | | |
|---|---|---|---|---|
| 6,311,231 B1* | 10/2001 | Bateman | ................. | H04L 29/06 707/E17.119 |
| 8,000,989 B1* | 8/2011 | Kiefhaber | .............. | G06Q 40/00 705/7.12 |
| 8,126,702 B2* | 2/2012 | Lang | ....................... | G06F 16/84 704/8 |
| 8,681,970 B2* | 3/2014 | Fedorov | ................ | H04M 3/523 379/265.02 |
| 2002/0164006 A1 | 11/2002 | Weiss | | |
| 2003/0185379 A1* | 10/2003 | O'Connor | ............... | H04L 51/14 379/265.02 |
| 2010/0017742 A1* | 1/2010 | Rhodes | ................. | G06F 3/0482 715/780 |
| 2014/0173078 A1* | 6/2014 | McCord | ................. | G06Q 30/01 709/223 |
| 2016/0344870 A1* | 11/2016 | Nair | .................... | H04M 3/5166 |

(Continued)

*Primary Examiner* — Dennis W Ruhl
*Assistant Examiner* — Donald J Edmonds
(74) *Attorney, Agent, or Firm* — Haynes and Boone, LLP

(57) ABSTRACT

There is provided systems and method for intelligent channel steering based on dynamically determined intents during channel interactions. A user may contact an organization, such as an online service or payment provider through a first communication channel in order to seek assistance or resolution with some help query or request. The organization's system may dynamically prioritize the user's intent when submitting the help request and based on the user's actions during the communications. The system may further present other communication channels that may assist the user in resolving their help request. The user may be steered to one or more of those channels. When navigating between channels a data object may be generated in the first channel that tracks the user's intent, actions, and steps taken to resolution, which may be transferred between channels and translated to a code or scripting language handled by the other channel.

20 Claims, 8 Drawing Sheets

(56) References Cited

U.S. PATENT DOCUMENTS

| | | | |
|---|---|---|---|
| 2018/0027029 A1* | 1/2018 | Linder | H04L 69/14 |
| | | | 709/204 |
| 2018/0034753 A1* | 2/2018 | Willshire | G06F 11/3664 |
| 2018/0082213 A1* | 3/2018 | McCord | G06N 7/005 |
| 2018/0084111 A1* | 3/2018 | Pirat | H04L 51/04 |

* cited by examiner

Contact Customer Service 3000

I'm having an issue with: 3002

Disputes and account limitations > 3004

This information might help  3006
Related Topics

*"I have a payment problem."*
*"Can I get a refund?"*

Contact us for this issue

Ask the community
[Recommended]
3008

Email us
3010

Call us
3012

HELP Contact Us

Fig. 4A

INTELLIGENT CHANNEL STEERING BASED ON DYNAMICALLY DETERMINED INTENTS DURING CHANNEL INTERACTIONS

TECHNICAL FIELD

The present application generally relates to electronic communication channels for resolution of user issues with a system and more specifically to determining a user's intent for use of an electronic help system and intelligent steering of the user to specific communication channels within the system.

BACKGROUND

Users may engage with organizations through electronic systems to seek assistance with services provided by the organizations. For example, interactive voice response (IVR) systems provide a technology allowing a user to interact with, such as receive and transmit data between, computer systems including networked servers. A server may also host the website, which may be offered to the user as an entry portal to look up and query the system for particular assistance and help offered by the system. However, IVR systems are constructed separate from website, call-in services, and other electronic communication pathways and channels. Thus, existing servers require implementation and integration of separate systems in order to offer different channels for user assistance. This leads to inconsistent presentation of data and does not unite a user's help request between different systems, causing the user to waste time when browsing through different menus and providing input. This also causes the backend processor to process multiple sets of instructions, which wastes server resources and causes duplicative data input, requiring additional database storage. Thus, users requesting help from an organization may not be efficiently guided between channels when seeking assistance. Moreover, organizations are unable to determine users' intent for their help request when navigating between multiple channels, which increases processing time and decreases user satisfaction.

BRIEF DESCRIPTION OF THE DRAWINGS

FIG. 4A is an exemplary device interface displayed to a user during channel steering based on dynamic intent prioritization, according to an embodiment;

Figure 1:
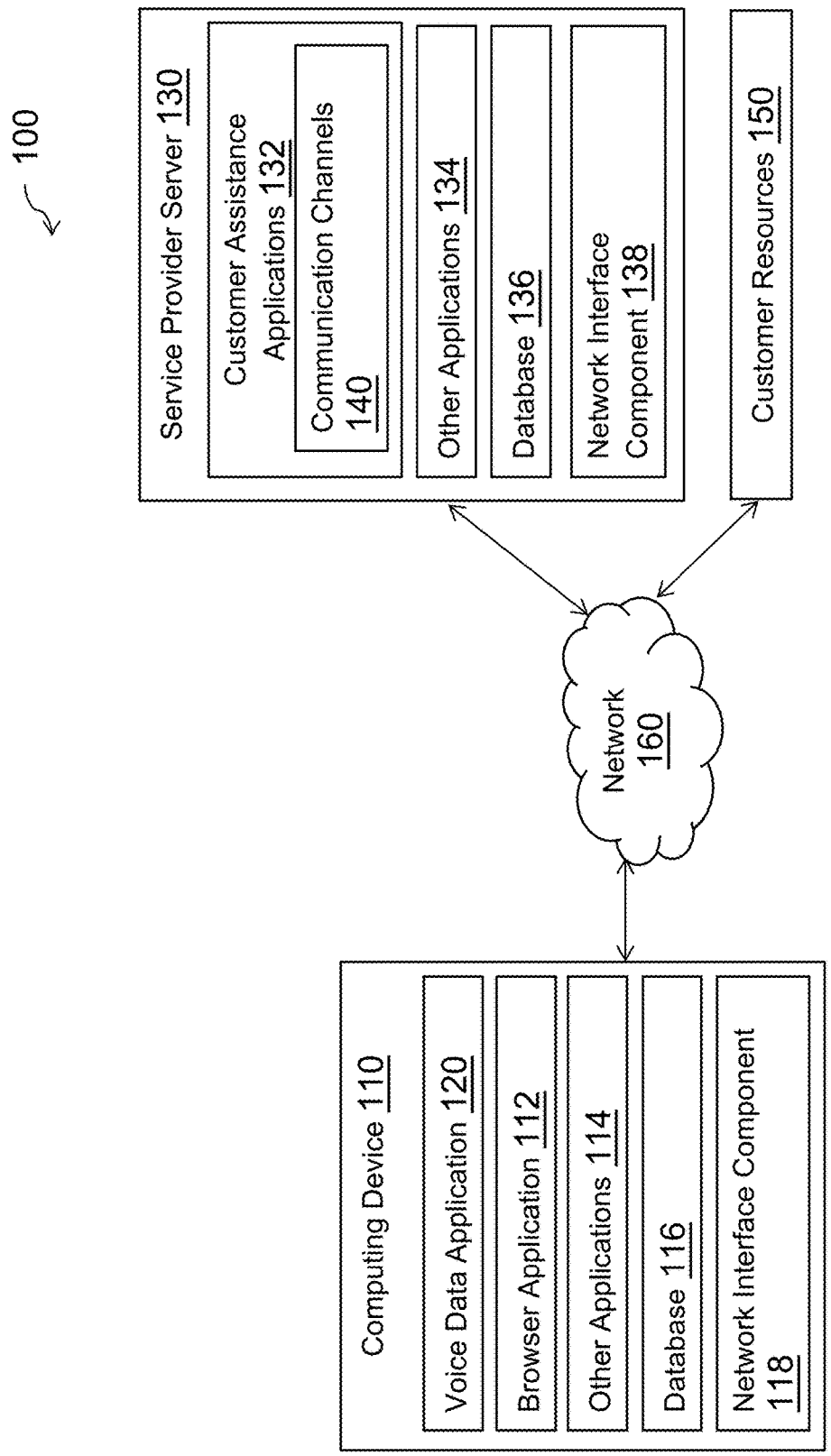
FIG. 1 is a block diagram of a networked system suitable for implementing the process described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Organizations, such as online transaction service providers or other types of service providers, may provide multiple electronic communication channels that allows users, such as customers of the service providers, to interact with the service providers and seek help or assistance with services offered by the service providers, for example, through a customer care portal, help desk, or other assistance platform. Each one of the channels provides a communication pathway that a user's device may utilize to browse available data for help or assistance topics, resolutions, and other information, as well as submit help queries or requests for assistance with a particular issue. However, each channel provides different data and services, and may have different hours of operation, resolution cost and success rates, availability of agents and systems to resolve issues, and other particular attributes. Moreover, users may have different intents for resolution of an issue, value to the service provider, channel preferences, and mandatory preferences during resolution of the issue or assistance request. Thus, the user may "surf" or navigate between multiple channels when attempting to resolve an issue, where the system may intelligently determine the user's intent in contacting the system and attempt to steer the user to the best channel for help resolution.

In this regard, when a user utilizes a computing device to provide a customer care, help, or assistance request through an electronic communication channel, the system may intelligently determine the user's contact reason or "intent" for the help request and may dynamically prioritize the user's intent and list eligible intent resolution data within a specific channel based on the user's intent. For example, a user's intent in contacting the service provider's help resolution system may be to determine why a payment or transfer has not been received by the user's account (e.g., "Why haven't I received a payment made 10 days ago?"). The intent may therefore be related to a help request that the user wishes to resolve. In this regard, the system may first access a list of intents that are statically ordered and may be assigned values in decreasing value (e.g., with a bottom most intent as a lowest value). The system may then fetch dynamic data for the user that may affect the listing of eligible intents for the user and thus the corresponding intent resolution data or accessible processes to resolve the intent of the user. The dynamic data may be scored and assigned values based on different parameters, such as time-stamps of the triggering action/data in the dynamic data and other factors. If there are multiple intents that satisfy the particular dynamic data, additional value may be assigned to child or secondary intents from a parent or primary intent (e.g., a sub-intent or factor that is under a parent or umbrella intent and more specifically relates to the dynamic data), and the parent intent may be ignored or assigned a zero value.

Customer preferences or other user attributes may be accessed and used to assign values to the intents. For example, a customer preference for a particular help resolution process or a particular help resolution subject may adjust the values of the intents determined from the dynamic data. The dynamic parameter values for the intents may then be aggregated, and values set at zero may be eliminated. The system may then sort the intents in decreasing order of aggregated values, which may be used to list eligible intents for the user in contacting the system for the help request. Utilizing the intent list for the user, the user may be presented with an interface allowing selection of a particular intent and/or intent resolution data/process (e.g., based on the above example, an intent resolution may include "May we assist with resolving your lack of payment?"). Thus, the intents may assist in dynamically ordering help and resolution data presented to the user in one or more graphical user interfaces (GUIs) based on the user's intent in contacting the system.

Some of the dynamic data used to determine the intent may include an intent cache that includes a customer-initiated intent (e.g., an intent selected, input, or indicated in a channel) and a previous channel action from a channel that the user previously used when looking for help resolution for the intent. The dynamic data may also include customer action data, which may include an action taken to resolve the issue associated with the intent and the customer's activity data when utilizing the service provider's platform (e.g., previous services used by the platform, such as account, payment, transfer, or other services that customers or the service provider may use). Intent metadata may include customer preferences, intents needed to be compliant with regulations or laws, and inter-dependence between intents (e.g., where one or more issues for an intent may overlap and cause the intent for contacting the service provider to include multiple intents for resolution). Moreover, a predictive model may also be used with the dynamic data to further score or assign values to intents.

Along with determination of the user's intent in contacting the service provider's assistance platform, the service provider's system may further determine a list of prioritized and ranked channels to steer the user to for resolution of the dynamically prioritized intents. Thus, the system may perform a channel steering scoring process that scores and lists a sorted order of electronic communication channels for the service provider that are available to assist the user in resolution of the issue associated with the user's intent in contacting the system. The system may fetch user and channel data for the user and the channels of the system, respectively. The data may include a channel intent list that provides a list of intents available for particular channels (e.g., a list of channels for an intent) and customer value data (e.g., engagement of the user, such as the value to the service provider of the user determined based on use of the service provider, total payment value, products the user uses, dispute rate, social impact, net promoter score, contact rate, etc.). Customer channel preference may dictate how the customer prefers to engage with the service provider, and a customer journey may be used to determine the user's historical use of channels to contact the service provider (e.g., over the past X days what channels they have used to resolve the issue or other issues). Other historical data may also be used to determine a user's intent, including user interactions with the system's other services (e.g., account services, payment/transfer services, electronic transaction processing, messaging, etc.) and/or data provided to or generated by the other services (e.g., account data, transaction histories, messages, etc.). The historical data may be retrieved from other websites, resources, or online entities, which may be used to determine a user's intent. Such online entities may include email, messaging, social networking, media sharing, etc., that provide services to users and also may be used by the service to interact with a help system of those entities. Channel hours of operations and availability of agents may also be accessed, as well as each channel's cost and resolution rates for intents. Moreover, the customer may express certain mandatory characteristics for the channel, such as if they want only web-based communications and will not answer calls or respond to text messages.

Next the data may be filtered, scored, and sorted. For example, all channels may be eliminated where the user specifically designates that they will not use that channel (e.g., "Do no contact me by phone or Short Message Service (SMS)"). Specific channels may also be eliminated based on hours of operation and/or agent/teammate availability, such as if the channel is unavailable at the time of the user request and intent or if the user specifically wants an agent but they are unavailable. Customer contact channel history may be used to filter, sort, and score previous channels that the user has successfully received resolution for an intent. Additionally, if the user is highly engaged and of high value to the service provider (e.g., based on tenure, total payment values, etc.), the channels may first be scored and sorted by cost and resolution rate, and then customer channel preference. Otherwise, with lower engaged customers, these two factors may be reversed in an order of scoring and sorting. Thus, a final list may be created that sorts and orders the channels based on the aforementioned characteristics and steers the user to the channels for best resolution of the user's issue (e.g., help request) associated with the user's intent in contact the system.

The dynamically prioritized intents and channel steering list may then be presented to a user through one or more GUIs on the service provider's assistance platform during guiding of the user to the intent and/or channel that may assist the user. This may occur at the same time, or this may instead separate times based on guiding the user to the proper intent and channel. For example, the dynamically prioritized intents and corresponding action recommendations may first be presented to the user on the user's channel of interaction, such as the channel the user is currently using to interact with the system. The user may then view and navigate to particular intents within that channel using the dynamically prioritized intents. However, if this guidance is not helpful and/or does not resolve the user's issue, the channel steering list may then be presented to the user to better guide the user to another channel that may be capable of optimally resolving the issue for the user.

The user may therefore be guided to an intent resolution process and/or another channel for resolution of the user's intent in contacting the system. In some embodiments, when an intent is known, but cannot be satisfied or resolved (e.g., based on channel availability and/or help resolution processes), an administrator or service agent may take over the user's intent and assist the user. Thus, help speed may be increased by based on the knowledge of the intent. Prior to navigation between channels by the user, a data object may be generated for the user's intent, user and channel usage data (e.g., channel actions, preferences, channel history, etc., described above), and other data associated with the user's help request in the present channel. The data object may be generated in a code or scripting language native to the present channel. For example, an IVR system may accept vocal and/or textual inputs (e.g., a button or key selection or a voice command) for a call-in IVR system, and therefore may generate the data object as a Java flow object. However, a chat-based system may utilize a guided workflow platform (e.g., PEGA or the like). Thus, if the user wishes to navigate to the next channel based on the channel steering process, the data object may be required to be moved to the next channel and translated into a state that may be processed by the next channel.

Thus, the data object becomes associated with the user, such as by being associated and/or stored with an identifier for the user and/or computing device the user is using when requesting assistance from the system. The data object may then be movable between the channels, such as by being transferred or transmitted to the next channel and/or accessible by an agent or process in the next channel. When entering the next channel, a process may translate the data into a processing language and/or data structure type that can be handled by the second channel. The second channel may then load the data into the channel's help resolution processes, for example, the processes to assist with the user's intent. In order to easily move data objects between channels, intents may be mapped across a plurality of different channels for the service provider, such as the first and second channels. This may be done through a centralized intent mapping system of the service provider.

Thus, the service provider's system may include a central repository of intents that is created prior to channel steering and transfer of intents between channels, where the channel actions and intents are mapped upfront so that the system and correspond system channels are capable of passing channel-specific code in real-time between channels. The customer intents may be mapped to contact channels and corresponding resolution pathways for the intents (e.g., channel prompts, flows, etc.). These intents and corresponding channel-specific actions, once mapped, may be stored to the central repository of intents. This centralized system may then be used for predicting the intent using the dynamically prioritized intent processing, as well as identifying the best action to be offered in the corresponding channel in which the user contacts the system. Additionally, the centralized repository may be utilized to easily transfer the data object for a user's intent between channels based on the mapping. The centralized repository of intents provides benefits to the system by providing a single repository and user interface for governance of intents. This complete view makes it easier to view and control channel configurations and provide support for such channels. Additionally, this provides a consistent experience across all channels as intents and contextual data is understandable between each channel. Additionally, creating, removing, and updating of intent action data is easily performed through the centralized repository, and the centralized repository may be scaled into other channels easily.

Additionally, the channel may utilize the data object to skip one or more processes within the help resolution process or load the user's data to that process so that the user does not need to repeat data entry and/or previously completed processes. For example, during a refund flow for an intent associated with payment refund, a first state or step may be to identify the transaction. Where this is done in the first channel, the data object may be used to skip this step in the next channel when steered between channels. Moreover, after steering the user between multiple channels to resolve a user intent, the system may optimize the channel steering process if multiple navigations are required to reach a successful resolution. For example, if three channels offer similar intent resolution processes and a third channel of those has a higher acceptance or resolution completion, the third channel may be assigned a high value in future channel steering processes in order to eliminate the second channel. This may also assist in reducing the number of steps required to be skipped between channels and the amount of data processing and translation of the data object for the user.

Thus, the present system provides a process to reduce processing requirements and data storage overhead, while increasing resolution speed of service provider help platforms. Users are not required to navigate or surf between multiple platforms, which consumes unnecessary network bandwidth and server/device data processing availability. Additionally, the service provider's communication pathways may be streamlined so that data may be transferred between pathways and previously processed data may be conveniently translated for processing in other channels. Thus, the service provider's server is not required to perform duplicate processing of help queries and requests, and instead is able to operate on a single data structure without disadvantageous processing and allowing the service provider to skip unnecessary processing steps. All of this results in improved server performance and processing speeds while reducing processing and resolution times of submitted help queries.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user device 110, a service provider server 130, and customer resources 150 in communication over a network 160. User device 110 may be utilized to access the various features available for user device 110, which may include processes and/or applications associated with service provider server 130 to access one or more communication channels in order to resolve an issue. Service provider server 130 may identify and dynamically prioritize the user's intent(s) in utilizing service provider server 130 for issue resolution, and may provide channel steering to channels that may assist the user is resolution of the user's issues for their intent in using service provider server 130. Additionally, service provider server 130 may generate a data object that allows tracking of the user's issue, intent, and actions so that data may be transferred between channels and repeated data input and processing may be removed when navigating between channels.

User device 110, service provider server 130, and customer resources 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

User device 110 may be implemented as a communication device that may utilize appropriate hardware and software configured for wired and/or wireless communication with service provider server 130, and/or customer resources 150. For example, in one embodiment, user device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. User device 110 may correspond to a device of a consumer or customer that accesses service provider server 130 for issue resolution. Although only one communication device is shown, a plurality of communication devices may function similarly.

User device 110 of FIG. 1 contains a voice data application 120, a browser application 112, other applications 114, a database 116, and a network interface component 118. Browser application 112 and other applications 114 may correspond to executable processes, procedures, and/or applications with associated hardware. In other embodiments, user device 110 may include additional or different modules having specialized hardware and/or software as required.

Voice data application 120 may correspond to one or more processes to execute software modules and associated devices of user device 110 to provide voice data transfers over a network with another entity, such as service provider server 130. In this regard, voice data application 120 may correspond to specialized hardware and/or software utilized by a user of user device 110 to an application and processes to utilize components of user device 110 for telephonic or voice data communications and transfers. For example, voice data application 120 may access a publicly switched telephone network (PSTN) through network interface component 118 and call a call-in center or service associated with service provider server 130. In other embodiments, voice data application may utilize a web-based chat service, Voice over IP (VoIP), Voice of LTE (VoLTE), or other voice data service. A call-in service may be handled by agents, which may be accessed directly or through one or more commands or inputs (e.g., menu selections, voice data input, etc.), and the agents may further input data for the user associated with user device 110. The input and help request provided through voice data application 120 may be processed to determine a user intent and channel steering list by service provider server 130, as discussed herein. Additionally, voice data application 120 may be used to access a new channel for resolution of an intent that was previously generated through another channel provided by voice data application 120 or browser application 112.

In other embodiments, the call-in service may be automated and accessible through voice data application 120. For example, voice data application 120 may be configured to receive an interactive voice response (IVR) like interface associated with an IVR system provided by service provider server 130 over a PSTN. Voice data application 120 may receive a software component library that may read IVR flow information for a website and present the IVR flow information, or may directly output the IVR system based on received data. In various embodiments, voice data application may correspond to a general browser application (e.g., browser application 112) configured to retrieve, present, and communicate information over the Internet (e.g., utilize resources on the World Wide Web) or a private network. However, in other embodiments, browser application 112 may include a dedicated application of service provider server 130 or other entity (e.g., a merchant), which may be configured to assist in voice data transfers.

Browser application 112 may correspond to one or more processes to execute software modules and associated devices of user device 110 to access an online platform provided by service provider server 130 for the resolution of help issues and requests, and input data that may be used by service provider server 130 for dynamic intent prioritization and channel steering processes, as well as navigate between channels based on input data and requests. In this regard, browser application 112 may correspond to specialized hardware and/or software utilized by a user of user device 110 to access a platform provided by service provider server 130 and provide a convenient interface to permit a user to browse information available over network 160 including accessing webpages, entering information from webpages, and navigating websites through webpages that provide help and assistance through the channels provided on the websites (e.g., a web-based chat channel, an online help desk, a browsable help resource or database, etc.). In certain embodiments, browser application 112 may be implemented as a web browser configured to view information available over the Internet or access a website of a website provider, such as service provider server 130 and/or customer resources 150. For example, browser application 112 may be utilized to access websites and engage in online actions with service provider server 130 and/or customer resources 150. Accessible websites may include those associated with help resources and may include one or more channels to interact with the help resource.

In this regard, browser application 112 may also be used to submit a help query or process a previously submitted request using another channel provided by service provider server 130. Thus, browser application 112 may be used to provide input and browse channels that may be used for dynamic intent prioritization and channel steering by service provider server 130. Browser application 112 may display one or more interfaces that list intents determined from user and channel data, as well as channels recommended for a user based on the intent data and other user and channel data. Browser application 112 may be used to receive results from transfers between channels and help resolution processes and data.

In various embodiments, user device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 160, or other types of applications. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use components of user device 110, such as display devices capable of displaying information to users and other output devices, including speakers.

User device 110 may further include database 116 stored in a transitory and/or non-transitory memory of user device 110, which may store various applications and data and be utilized during execution of various modules of user device 110. Database 116 may include, for example, identifiers such as operating system registry entries, cookies associated with browser application 112 and/or other applications 114, identifiers associated with hardware of user device 110, or other appropriate identifiers, such as identifiers used for payment/user/device authentication or identification, which may be communicated as identifying user device 110. Database 116 may include received data for a help channel, as well as data objects generated for a user's intent when utilizing a help channel for use in navigation between channels. However, in other embodiments, such data may be retained only by service provider server 130.

User device 110 includes at least one network interface component 118 adapted to communicate with service provider server 130 and/or customer resources 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Network interface component 118 may communicate directly with nearby devices using short range communications, such as Bluetooth Low Energy, LTE Direct, WiFi, radio frequency, infrared, Bluetooth, and near field communications.

Service provider server 130 may be maintained, for example, by an online service provider, which may provide online services to customers through electronic devices, such as transaction processing services for payment of goods and/or services (e.g., items), digital wallet services, transfer services, and the like. In this regard, service provider server 130 includes one or more processing applications which may be configured to interact with user device 110, customer resources 150, and/or another device/server to facilitate the online services, as well as provide customer care, assistance, and help services to users. Thus, service provider server 130 may provide an online platform for providing help resources and communication channels, such as a website or other online resource accessible by user device 110. In some embodiments, service provider server 130 may solely provide customer care and assistance services, for example, when internal or external to another service provider. Service provider server 130 may be maintained by or include any type of service provider, which may sell items to users.

Service provider server 130 of FIG. 1 contains customer assistance application 132, other applications 134, a database 136, and a network interface component 138. Customer assistance application 132 and other applications 134 may correspond to executable processes, procedures, and/or applications with associated hardware. In other embodiments, service provider server 130 may include additional or different modules having specialized hardware and/or software as required.

Customer assistance application 132 may correspond to one or more processes to execute modules and associated specialized hardware of service provider server 130 that provide an online platform for customer assistance and care, which may be accessible through one or more communication channels that provide a pathway for electronic communications with service provider server 130. In this regard, customer assistance application 132 may correspond to specialized hardware and/or software of service provider server 130 to provide a convenient interface to permit the service provider to provide help resources, data, and agents through one or more of communication channels 140. Customer assistance applications 132 may first receive a help request, query, or browsing of help data, and may access additional user data for the user. The user data may relate to customer information for the user associated with their history, preferences, and previous actions. Customer assistance application 132 may dynamically prioritize the user's intent(s) for contact and using the help platform based on the user data and additional data, such as available intents for processing, intent data and information, and predictive models for intent prioritization. In some embodiments, such data may be available with customer resources 150. The list of eligible intents for a user may then be dynamically ordered and output to the user for selection through one or more interfaces.

Customer assistance applications 132 may further provide a channel steering process by fetching the user data and channel data when determining a channel for routing the user based on their intent(s). The user data may include the aforementioned customer information, as well as user preferences for channels, history with channels, and mandatory channel attributes. The channel data may be related to available channels and channel data for intents, as well as channel attributes and resolution information. Using the data, the user may be steered to one or more channels for issue resolution related to the user's intent. Customer assistance applications 132 may also generate a data object for the user that is associated with the user and serves to track the user's intent and actions across multiple channels for ease of loading the user's intent and issue resolution data in a next channel after transfer of a user between channels. The data object may include all past data related to the user's contact reason or intent and may be translated into data structures handled by different channels based on navigation between channels.

Communication channels 140 may correspond to available electronic data transfer pathways for the use of sending and receiving data by customer assistance application 132. Communication channels 140 may be used by user device 110 to interact with service provider server 130 and may correspond to application-based, web-based, and/or voice data-based communication channels that allow a user to send and receive data between user device 110 and service provider server 130. For example, communication channels 140 may include one or more of a PSTN, websites or other online resources available over the Internet or other WAN, a web-based chat or messaging service (including email), or other communication pathway. Communication channels 140 may provide for webpages that are displayable through user device 110. In this regard, user device 110 may access one or more websites and view the webpages of the associated domain. The webpages may correspond to Hypertext Markup Language (HTML or similar XHTML and/or CSS) documents that may be accessed and transmitted using Hypertext Transfer Protocol (HTTP) by user device 110. In addition to providing the webpages, communication channels 140 may provide IVR like interfaces. Each of communication channels 140 may utilize a specific code or scripting language, or other data processing protocol, which may be separate or shared between channels. In this regard, as a data object for a user's intent and previous intent resolution information (e.g., steps in issue resolution) is transferred between communication channels 140, customer assistance application 132 may assist in translating the data objects between the particular data structures handled by each of communication channels 140 so that the data may be handled by the next data channel.

In various embodiments, service provider server 130 includes other applications 134 as may be desired in particular embodiments to provide features to service provider server 130. For example, other applications 134 may include security applications for implementing server-side security features, programmatic client applications for interfacing with appropriate application programming interfaces (APIs) over network 160, or other types of applications. Other applications 134 may include server interface applications for an online server platform that output data to one or more devices. For example, other applications 134 may contain software programs, executable by a processor, including a graphical user interface (GUI) configured to provide interface data for display on devices.

Service provider server 130 may further include database 136 stored in a transitory and/or non-transitory memory of service provider server 130, which may store various applications and data and be utilized during execution of various modules of service provider server 130. Database 136 may include, for example, identifiers such as operating system registry entries, cookies associated with customer assistance application 132 and/or other applications 134, identifiers associated with hardware of service provider server 130, or other appropriate identifiers, such as identifiers used for payment/user/device authentication or identification. In various embodiments, database 136 may include determined intent lists and channel steering lists, as well as data objects generated for a user during a help request for a determined intent.

Service provider server 130 includes at least one network interface component 138 adapted to communicate with user device 110 and/or customer resources 150 over network 160. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Customer resources 150 may correspond to one or more online resources that a user may interact with that may cause generation of user data. For example, customer resources 150 may correspond to a merchant or payment platform where a user engages in a transfer or payment of funds. In other embodiments, customer resources 150 may correspond to online account usage platforms for an account serviced by service provider server 130. Issues may arise in the use of customer resources 150, where assistance or help is required from service provider server 130. Thus, service provider server 130 may access data provided by customer resources 150 when determining a user's intent for help resolution and steering the user to a particular channel for resolution.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2A:
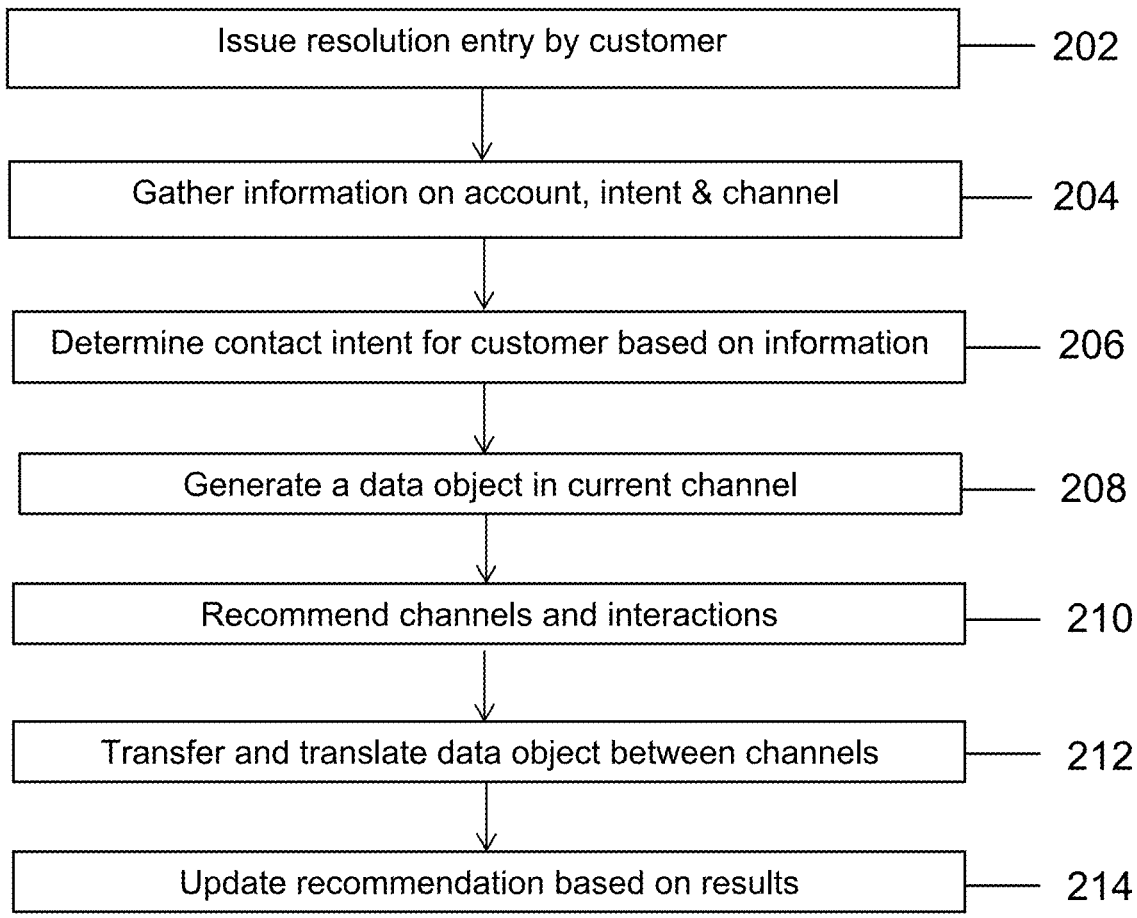
FIG. 2A is an exemplary flowchart for determination of user intent and channel steering information based on available user and system data, according to an embodiment.

FIG. 2A is an exemplary flowchart for determination of user intent and channel steering information based on available user and system data, according to an embodiment. Note that one or more steps, processes, and methods of process 200a described herein may be omitted, performed in a different sequence, or combined as desired or appropriate.

Process 200a shows a simplified high level channel steering flow 1000. Channel steering flow 1000 starts at step 202, when a customer enters into issue resolution, for example, using a help or assistance platform and communication channel provided by a service provider. This may occur through a telephonic voice data exchange, a web-based service, a chat or text message service, or other communication pathway for exchange of data by a user with the system. Once entered into the channel, an issue may be provided to the system, such as selection or entry of a help request. However, in other embodiments, the issue may have been previously identified in another channel. Thus, at step 204, information on the account, intent, and channel for the user and help request may be gathered. Such data may include previously entered data for a help request, user data known for the user, and/or information about the channel and channel activities of the user, including previously used channels.

At step 206, a contact intent is determined for the user based on the information gathered at step 204. The contact intent may correspond to an intent or reason for the user to contact the system and may be associated with an issue for resolution by the system. The contact intent may be determined based on both the user's actions within the channel when contacting the system, as well as historical data for the user, such as based on one or more most recent transactions conducted by the user with the system, including returning or obtaining information about one or more items from the recent transaction(s). The intent may also be determined based on system data, such as information about the present channel utilized by the user. After determination of the intent, in order to track the user's intent across multiple channels, the system may generate a data object in the current channel at step 208. The data object may be generated in a data structure handled by the channel and may include the user's intent and steps taken during issue resolution of the user's intent in contacting the system. The data object may also become associated with the user so that the user's intent may be tracked through multiple channels.

In provide channel steering for channel steering flow 1000, the system may recommend channels and interactions for the user based on the user's data and the system's channel data. For example, a user's data may be used to filter and sort channel data for one or more channels that offers interaction to assist the user in resolving the user's issue. Thus, the system's channel data may be used to filter and sort available channels and best channels for the user based on the user's data. The recommended channels and interactions may be ranked and may be output to a user in an interface of the system, such as an IVR interface and/or a web-based interface for selection by the user.

In response to selection of one of the channels and interactions for issue resolution, the data object may be moved and transferred between the channels at step 212. This may include translating the object into a data structure that can be handled by the second channel that accepts the data object. Once in the second channel, the user's intent, user data, and processing steps in issue resolution may be loaded to a process for issue resolution so that steps may be skipped or filled based on previously provided data. This may therefore reduce the required processing within the new channel and does not require the user to provide previously provided data again. Based on the result of issue resolution in the new channel, recommendations may be updated at step 214. This may allow of optimization of the system to steer to channels based on the previously provided data.

Figure 2B:
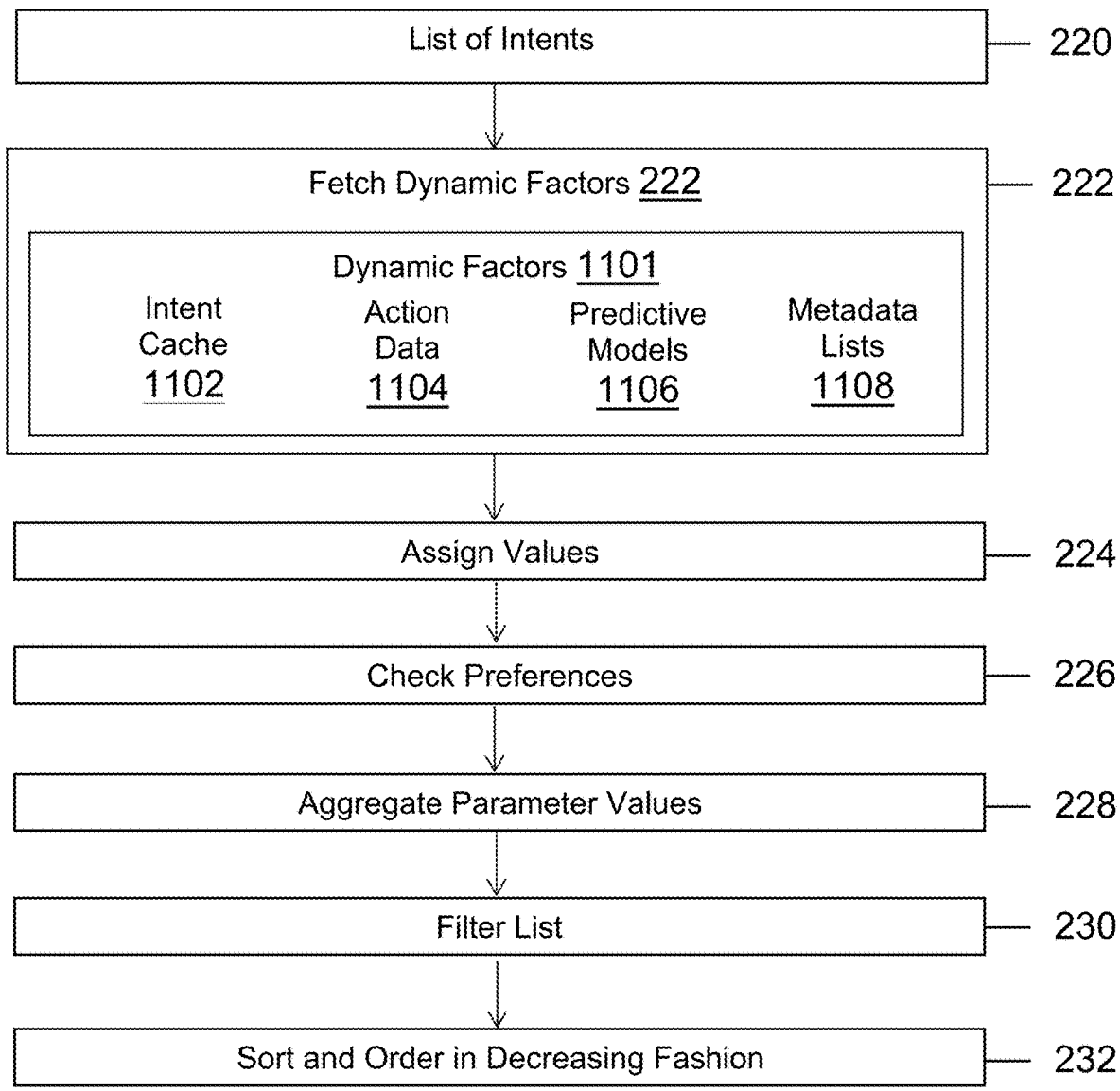
FIG. 2B is an exemplary flowchart for dynamic intent prioritization for a user, according to an embodiment.

FIG. 2B is an exemplary flowchart for dynamic intent prioritization for a user, according to an embodiment. Note that one or more steps, processes, and methods of process 200*b* described herein may be omitted, performed in a different sequence, or combined as desired or appropriate.

Process 200*b* corresponds to an intent prioritization 1100 for a user, such as a customer accessing a help or assistance service system provided by an organization. Intent prioritization 1100 begins at step 220, where a list of intents is determined for a help or assistance system. The list of intents may correspond to a static list for the system of intents associated with contacting the system issue resolution processes or data of the system. Dynamic factors for the specific user may be fetched, at step 222, which may be used for intent prioritization 1100 for a user. For example, data for dynamic factors 1101 shown in FIG. 2B may be used to rank and determine intent(s) for a user in contacting the system, and may include data in an intent cache 1102 having a customer-initiated intent (e.g., an intent selected, input, or indicated in a channel) and/or an action by the user in a previous channel. Dynamic factors 1101 may also include action data 1104 for a user, which may include an action taken to resolve the issue and activity with the service provider's platform, such as account activity, processing requests, etc. Predictive models 1106 may be used to predict certain intents. Additionally, metadata lists 1108 may include customer preferences, intents needed to be compliant with regulations or laws, and inter-dependence between intents.

At step 224, values are assigned to each of the intents based on the dynamic factors previous retrieved. This may correspond to scoring the intents within the static list based on the factors such that certain intents bubble up based on scores of values for the intents. However, in order to further determine the dynamically prioritized intents based on the dynamic factors, user preferences may be checked and used to eliminate certain intents or more highly value an intent at step 226. The parameter values for the intents may then be aggregated, at step 228, in order to obtain a list of intents. This list is then filtered to remove those intents with a low or zero score or value based on the dynamic factors, at step 230. Finally, the list of eligible intents is ordered, sorted, and presented in decreasing fashion so that the most likely or highest scored intent is listed first and then in decreasing order. This allows the system to rank the likely user intent, which may be used to present issue resolution processes and data in a ranked fashion based on the user's likely intent.

Figure 2C:
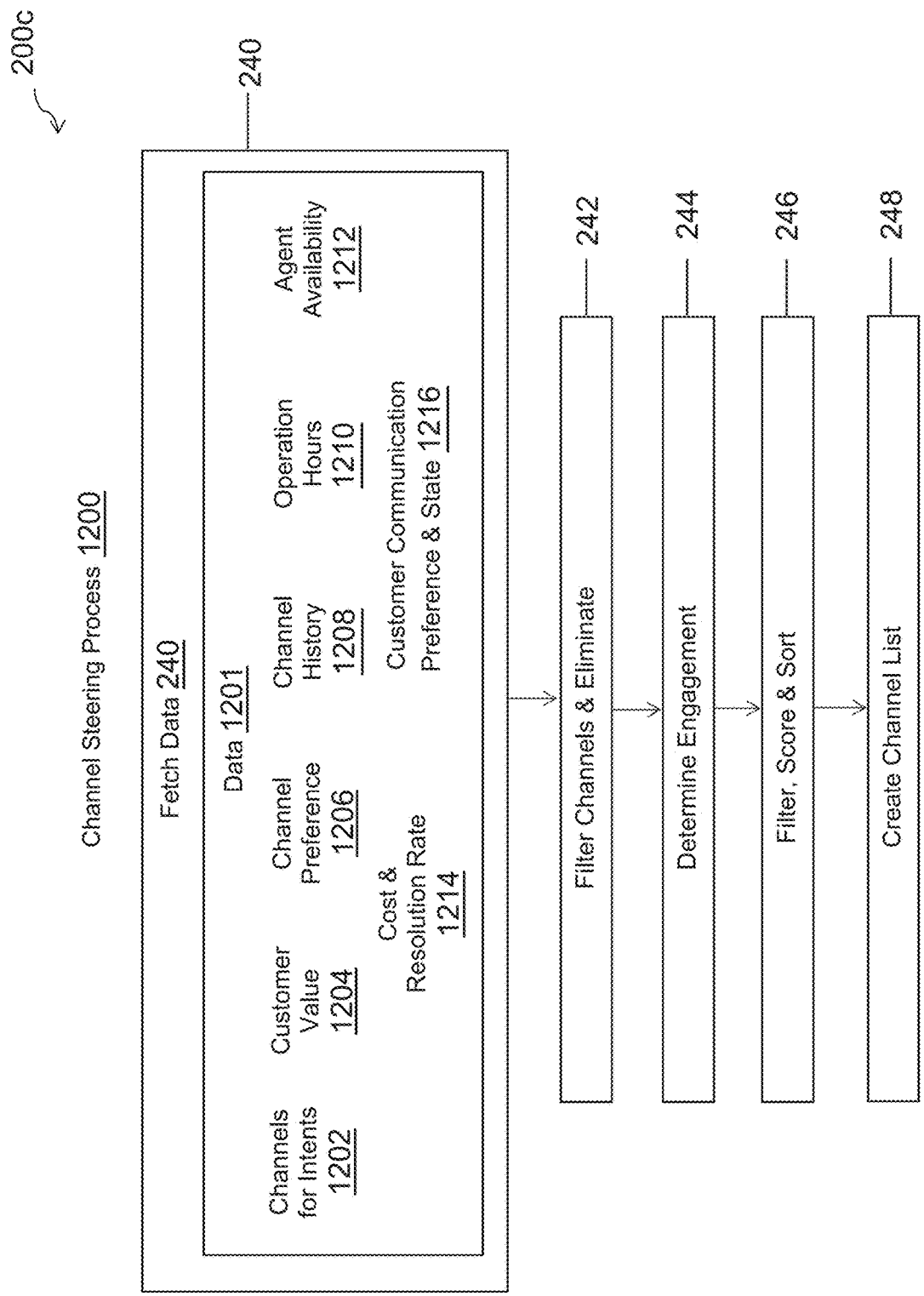
FIG. 2C is an exemplary flowchart for channel steering based on dynamic intent prioritization for a user, according to an embodiment.

FIG. 2C is an exemplary flowchart for channel steering based on dynamic intent prioritization for a user, according to an embodiment. Note that one or more steps, processes, and methods of process 200*c* described herein may be omitted, performed in a different sequence, or combined as desired or appropriate.

Process 200*c* corresponds to a channel steering process 1200 for a user, such as a customer accessing a help or assistance service system provided by an organization. Channel steering process 1200 begins at step 240, where a user within a channel or access the system has their data 1201 fetched. Data 1201 may correspond to user data for the user and channel data for the available channels used by the system of communications to provide assistance to users. For example, available channels for intents 1202 of the user may correspond to a channel list of particular channels that may service the user's intents. Customer value 1204 may include data of the user's value to the system and service provider, such as engagement of the user, such as the value to the service provider of the user determined based on use of the service provider, total payment value, products the user uses, dispute rate, social impact, net promoter score, contact rate, etc. Channel preference 1206 may include determinations and models of preferred channels of the user used for engagement of issue resolution processes. A channel history 1208 may include the user's historical use of channels to contact the service provider, which may be time limited and/or associated with the present issue and intents. Operation hours 1210 may include the hours of operation for channels and/or agents within the channel, which may be limited by the system. Agent availability 1212 may include data of whether agents are available and how quickly they may be available. Cost and resolution rate 1214 may include the costs of use of a channel, and the channel resolution rate for the user's intents. Additionally, customer communication preference and state 1216 may dictate which mandatory characteristics a channel may be required to have or not have, and the user's present state when utilising the system.

After fetching the aforementioned data, the channels may be filtered, and certain channels may be eliminated, at step 242. For example, customer communication preference and state 1216 may include mandatory channel characteristics which cause removal of certain channels. The customer may state that they will not utilize a call-in system or web-based chat, or the customer may state that they require an agent to assist them. After eliminating certain channels, at step 244, the engagement level of the customer may be determined using customer value 1204. Highly engaged customer may have different filtering, scoring, and sorting of channels, at step 246, than low engaged customers. At step 246, first channels may be eliminated based on agent availability 1212 and operation hours 1210. Next, channel history 1208 may be used to score those channels that the user has previously used for resolution of an issue associated with a user intent. Those with low resolution rates may be eliminated. For highly engaged customers, cost and resolution rate 1214 may then be used to further score and sort channels, while low engaged customers may instead have channels scored and sort by channel preference 1206. The final step of filtering, scoring, and sorting may be the other of the two, for example, by having high engaged customers have their channels finally scored and sorted using channel preference 1206 while low engaged customers have their channels scored and sorted using cost and resolution rate 1214. Once the filtering, scoring, and sorting at step 246 is finalized, a channel list is created in ranked order for channels recommended by the system, at step 248.

Figure 3:
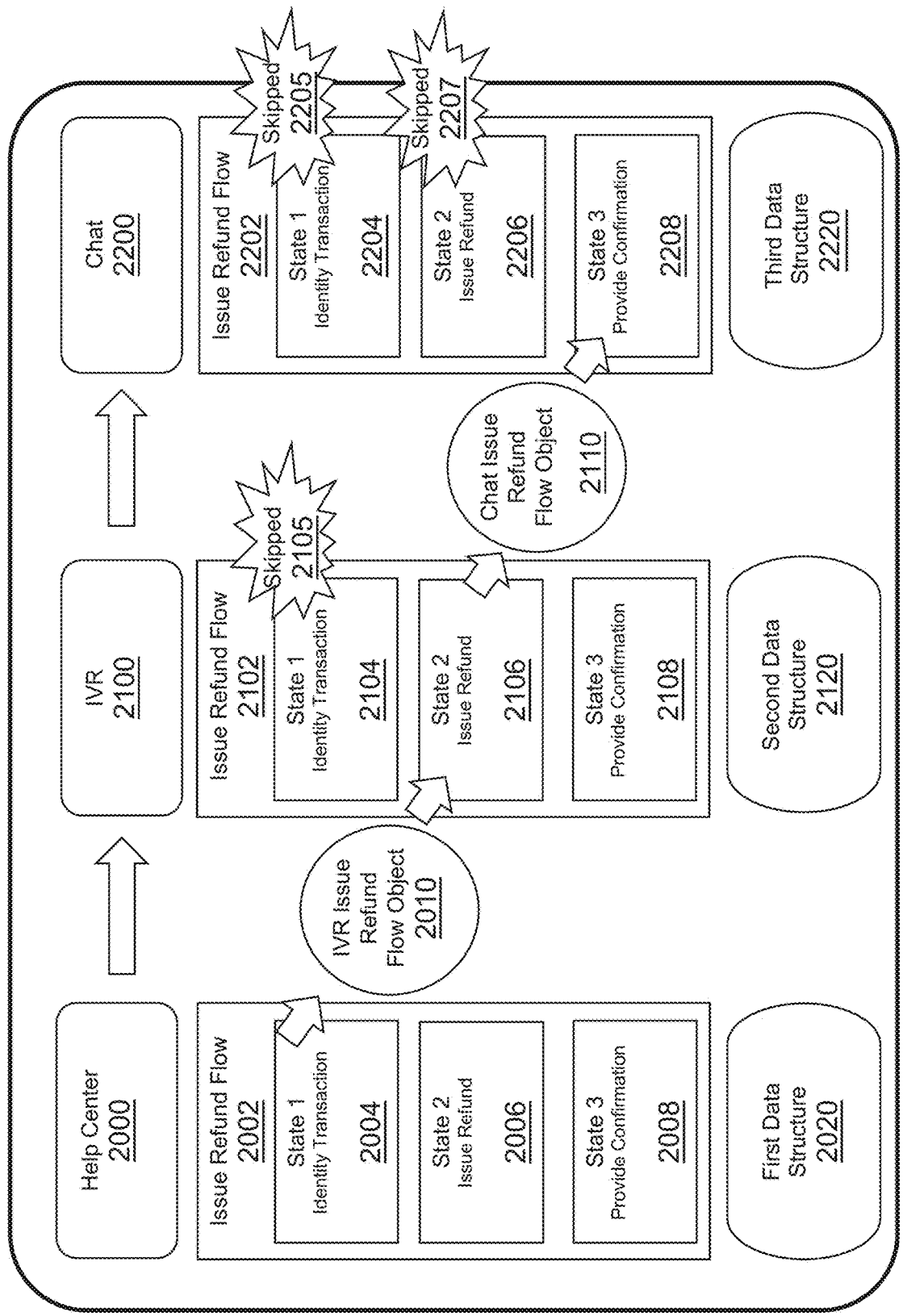
FIG. 3 is an exemplary flowchart for transferring and translating an intent data object during channel steering, according to an embodiment.

FIG. 3 is an exemplary flowchart for transferring and translating an intent data object during channel steering, according to an embodiment. Note that one or more steps, processes, and methods of process 300 described herein may be omitted, performed in a different sequence, or combined as desired or appropriate.

Process 300 may correspond to a process for transferring and translating a data object generated for a user based on the user's intent or reason for contacting the system (e.g., for issue resolution). In this regard, process 300 may start at a help center channel 2000 of a service provider, such as a web or application-based help center where a user may browse and search data, as well as submit queries. For example, issue refund flow 2002 may be a flow for issue resolution based on a refund intent for a user in contacting the system. Issue refund flow 2002 may have three states required for resolution of the refund intent, where state one 2004 corresponds to a requirement to identify a transaction, state two 2006 issue a refund, and state three 2008 provide confirmation. Each state may be processed in help center channel 2000 using a first data structure 2020 handled by help center channel 2000.

However, during navigation of issue refund flow 2002, the user may receive recommended other channels for resolution of the refund intent in a faster or more user-friendly manner. Thus, a data object handled initially by help center channel 2000 using first data structure 2020 may be converted into IVR issue refund flow object 2010 and may be moved on an IVR channel 2100. Issue refund flow 2102 in IVR channel 2100 may receive IVR issue refund flow object 2010 and may enter the data to the process for the issue refund intent within IVR channel 2100. In this regard, a state one 2104 of IVR channel 2100's issue refund flow 2102 is shown as skipped 2105 based on the previous data. Thus, state two 2106 and state three 2108 may remain for processing the issue refund intent using second data structure 2120 within IVR channel 2100.

In order to finish resolution of the issue refund intent, a third channel, a chat channel 2200, may be utilized to finish issue resolution for the user. Again, in order to process the data in chat channel 2200 using a third data structure 2220, IVR issue refund flow object may be converted to chat issue refund flow object 2110 to be handled by third data structure 2220. Once chat issue refund flow object 2110 enters chat channel 2200, issue refund flow 2202 in chat channel 2200 may have the data entered so that it may be populated in chat channel 2200. In this regard, state one 2204 is skipped 2205 and state two 2206 is skipped 2207 in issue refund flow 2202 of chart channel 2200. Thus, only state three 2208 remains to be completed in chat channel 2200.

FIG. 4A is an exemplary device interface displayed to a user during channel steering based on dynamic intent prioritization, according to an embodiment. FIG. 4A includes an interface 400a displayed by a communication device or user device corresponding generally to user device 110 of FIG. 1. Additionally, interface 400a may be displayed using the described features and functions of browser application 112 of FIG. 1 or another application displaying a help desk or other assistance platform after channel steering based on dynamically prioritized intents of a user.

Interface 400a display a contact customer service resource 3000 that may be provided by a service provider for interactions with users when the users are seeking help, assistance, or customer care. Additionally, the service provider may provide intent prioritization and channel steering services based on the user's intent in utilizing contact customer service resource 3000. For example, the user may initially provide an issue statement or help request in field 3002 and navigate to issue resolution flows 3004. Based on user and channel data for the system, issue resolution options 3006 may be determined based on the user's intents. Moreover, a community channel 3008, an email channel 3010, and a call-in channel 3012 may each be offered to the user as additional channels to contact to resolve the user's intents based on the user's intent and other available channel and service provider data. Thus, interface 400a allows for a user to navigate between channels for issue resolution based on intelligent intent prioritization and channel steering.

Figure 4B:
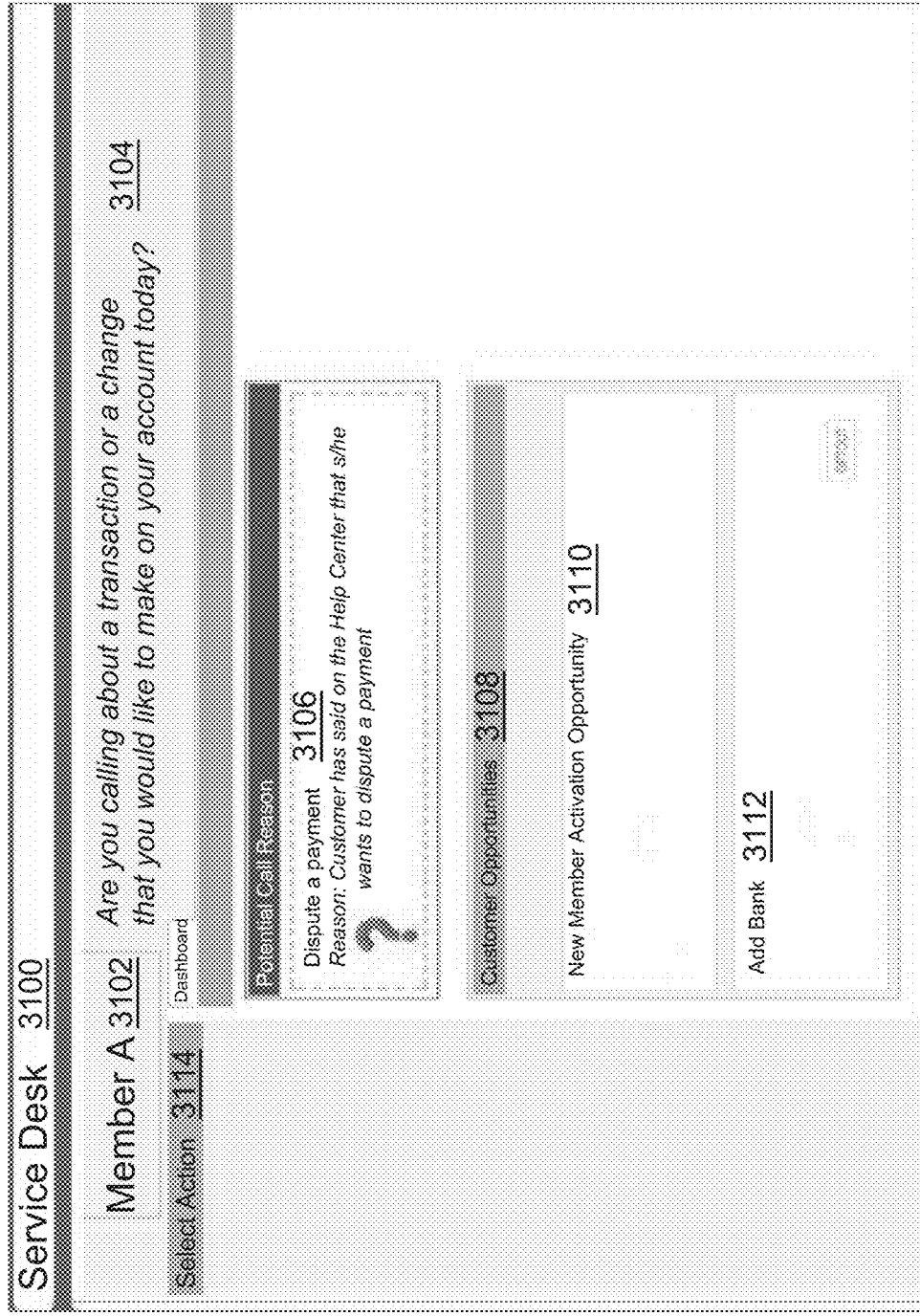
FIG. 4B is an exemplary device interface displayed to an agent of a service provider during channel steering based on dynamic intent prioritization, according to an embodiment.

FIG. 4B is an exemplary device interface displayed to an agent of a service provider during channel steering based on dynamic intent prioritization, according to an embodiment. FIG. 4B includes an interface 400b displayed by a communication device or user device in communication with a server for a service provider corresponding generally to service provider server 130 of FIG. 1. Additionally, interface 400b may be displayed using the described features and functions of customer assistance applications 132 of FIG. 1 or another application providing a help desk or other assistance platform that uses channel steering based on dynamically prioritized intents of a user.

A service desk portal 3100 allows an agent to view data for a user when the user seeks issue resolution. Thus, service desk portal 3100 in interface 400b displays information associated with a user's dynamically prioritized intent(s) and recommended channels for issue resolution associated with those intents. In this regard, service desk portal 3100 includes a user identifier 3102 and a provided issue resolution 3104. However, using the dynamically prioritized intents for the user, intelligent options may be displayed to the agent, such as a predicted contact reason 3106 based on the user's intent(s). The agent may be provided with a selectable action 3114 that may assist the agent in helping the user with predicted contact reason 3106. Additionally, customer opportunities 3108 may be used to present additional channels and products that may be offered to a user based on the user's intents and/or channel steering. For example, customer opportunities 3108 may include a new member activation opportunity 3110 that may be provided to the user to assist the user, as well as an add bank account option 3112 to provide additional assistance to the user or further services.

Figure 5:
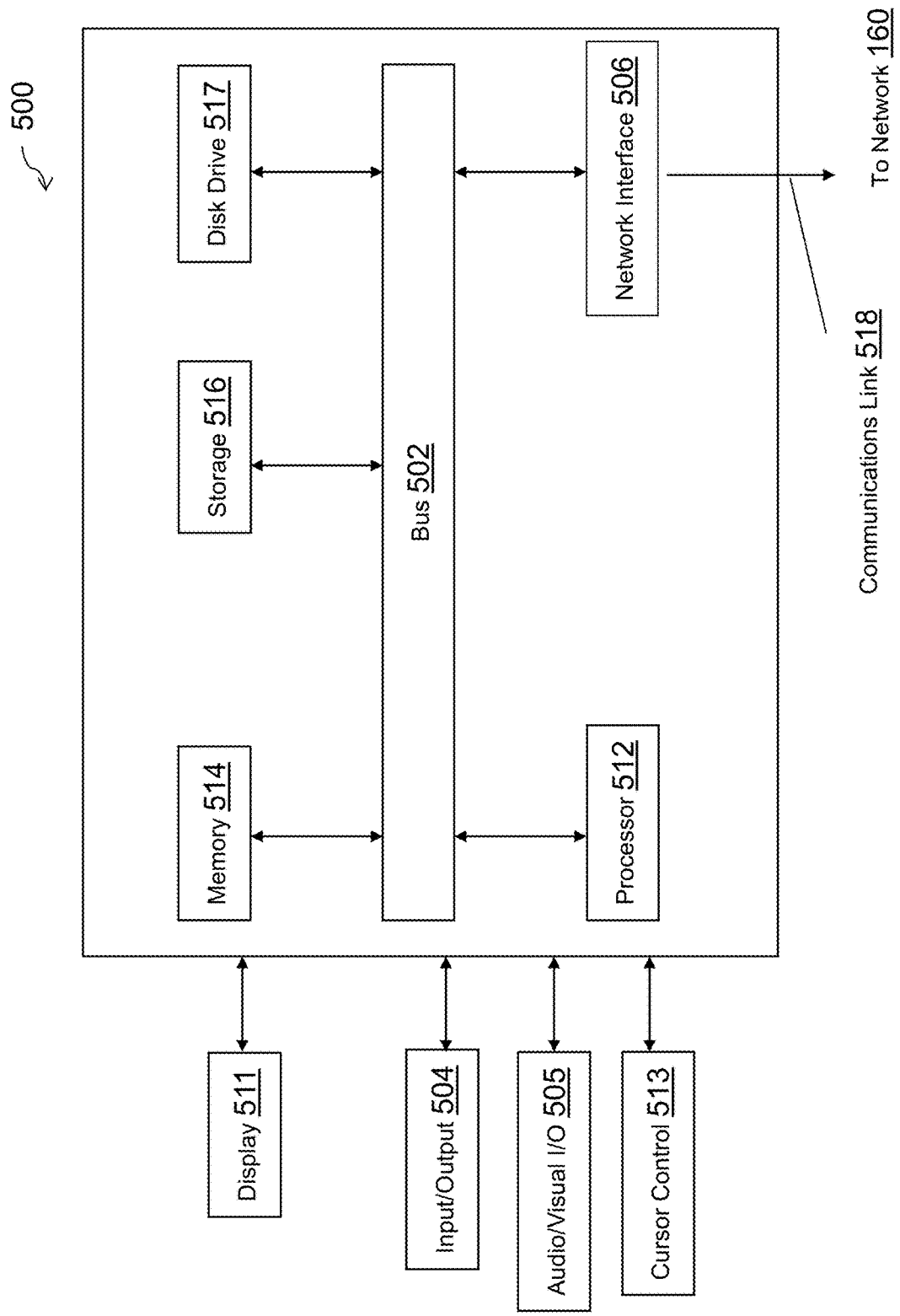
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, PDA, Bluetooth device, key FOB, badge, etc.) capable of communicating with the network. The merchant device and/or service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, a merchant device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    a non-transitory memory storing instructions; and
    one or more hardware processors coupled to the non-transitory memory and configured to read the instructions from the non-transitory memory to cause the system to perform operations comprising:
        receiving a communication from a computing device of a user through a first communication channel of the system;
        determining a communication intent for the system by the user based on the communication and the first communication channel;
        generating a first data object for the communication intent based on the first communication channel and a first data structure type handled by the first communication channel, wherein the first data structure type includes a first code language used by the first communication channel when communicating with the computing device;
        determining a customer engagement level of the user with the system based on a total payment value for the user with the system;
        determining a second communication channel recommended for addressing the communication intent based on the customer engagement level;
        determining a second data structure type handled by the second communication channel, wherein the second data structure type includes a second code language used by the second communication channel when communicating with the computing device;
        translating the first data object from the first code language to the second code language for the second communication channel; and
        loading the first data object to the second communication channel based on the determining the second communication channel and the translating, wherein the first data object is associated with the computing device in the second communication channel.

2. The system of claim 1, wherein the first data object is further transferred to the second communication channel based on at least one of a user request for a transfer to the second communication channel, a handling capability for the communication intent in at least one of the first communication channel or the second communication channel, a handling availability for the communication intent by an agent in the at least one of the first communication channel or the second communication channel, or an average time to resolve the communication intent in the at least one of the first communication channel or the second communication channel.

3. The system of claim 1, wherein the translating the first data object from the first code language to the second code language comprises generating a second data object handled by the second communication channel.

4. The system of claim 1, wherein the operations further comprise:
    determining a third communication channel for the addressing of the communication intent based on an action taken in the second communication channel; and transferring the first data object to the third communication channel.

5. The system of claim 4, wherein the operations further comprise:
optimizing a channel recommendation process of the system based on the determining the third communication channel after the transferring the first data object to the second communication channel.

6. The system of claim 1, wherein the operations further comprise:
skipping a processing step for an issue resolution process in the second communication channel based on the first data object.

7. The system of claim 1, wherein the first communication channel comprises an interactive voice response (IVR) communication channel based on a voice data connection with the computing device, wherein the first data object is generated based on at least an IVR system response in the IVR communication channel, and wherein the second communication channel comprises a web-based communication portal.

8. The system of claim 1, wherein the first communication channel comprises a web-based communication portal, wherein the first data object is generated based on at least one of a selection made in a help interface of the web-based communication portal or a navigation in the web-based communication portal, wherein the second communication channel comprises an interactive voice response (IVR) communication channel, and wherein the operations further comprise:
performing a navigation in the IVR communication channel based on the first data object without user input by the user in the second communication channel.

9. The system of claim 1, wherein the communication intent is further determined based on at least one of account information for an account of the user, a profile associated with the user, or payment information for a payment processed by the user or with the user.

10. The system of claim 1, wherein the operations further comprise:
tracking the first data object across a plurality of communication channels including the first communication channel and the second communication channel; and
updating a channel recommendation process based on the tracking.

11. The system of claim 1, wherein the operations further comprise:
recommending a service provided by the system based on the communication intent and the first data object.

12. A method comprising:
receiving a help request from a user in a first help channel provided by a service provider, wherein the first help channel utilizes a first data format in a first code language used when communicating with the user via the first help channel;
determining a customer engagement level of the user with the service provider based on a total payment value for the user with the service provider;
determining a user intent for help resolution based on the help request submitted through the first help channel;
determining intent data for the user based on the user intent and the first help channel, wherein the intent data comprises a data object in the first code language for the first data format processed within the first help channel;
associating with the intent data with the user;

determining a second data format handled by a second help channel associated with the customer engagement level, wherein the second data format utilizes a second code language used by the second help channel when communicating with the user;
translating the data object for the intent data from the first code language to the second code language for the second help channel; and
transferring the intent data to the second help channel provided by the service provider for the help resolution of the help request based on the translating.

13. The method of claim 12, further comprising:
determining user data for the user using at least one of a device for the user, an account for the user, or a previous help request provided by the user,
wherein the user intent is further determined based on the user data.

14. The method of claim 13, wherein the user data comprises at least one of a help preference for the help resolution or a channel preference for help channels used by the user for the help resolution.

15. The method of claim 12, further comprising:
determining channel data for help channels provided by the service provider, wherein the channel data comprises hours of operation for help resolution by the help channels, agent availability for agents provided by the help channels, a cost or resolution for the help request in the help channels, or a resolution rate for the resolution of the help request in the help channels; and
determining the second help channel based on the channel data and the customer engagement level.

16. The method of claim 15, further comprising:
presenting a list of recommended help channels to the user through a help desk interface of the service provider, wherein the list of recommended help channels includes the second help channel.

17. The method of claim 12, wherein the associating the intent data with the user comprising storing the intent data with an identifier associated with one of the user or a device associated with the user, and wherein the intent data is retrievable within the second help channel for loading the intent data to a help resolution process in the second help channel.

18. The method of claim 17, wherein the transferring the data object to the second help channel comprises:
loading the data object to the help resolution process based on the identifier, wherein the data object causes at least one step in the help resolution process to be skipped based on the intent data.

19. A non-transitory machine-readable medium having stored thereon machine-readable instructions executable to cause a machine to perform operations comprising:
receiving an assistance request from a user through a first electronic communication pathway of a service provider, wherein the first electronic communication pathway utilizes a first code language used when communicating with the user via the first electronic communication pathway;
generating a data object for the assistance request based on an intent of the user for assistance provided by the service provider, wherein the data object is generated based on user data for the user and assistance data for the assistance provided by the service provider, and wherein the data object is generated using the first code language for the first electronic communication pathway;

determining a customer engagement level of the user with the service provider based on a total payment value for the user with the service provider;

determining a second electronic communication pathway that provides a potential resolution process for the intent of the user for the assistance based on the user data, the assistance data, and the customer engagement level;

determining a second code language used by the second electronic communication pathway when communicating with the user;

translating the data object from the first code language to the second code language for the second electronic communication pathway; and transferring the data object from the first electronic communication pathway to the second electronic communication pathway based on the translating, wherein the data object loads the intent of the user to the potential resolution process within the second electronic communication pathway.

20. The non-transitory machine-readable medium of claim 19, wherein the operations further comprise:

determining a list of pathways available for the assistance provided by the service provider, wherein the list of pathways excludes at least one pathway provided by the service provider based on user preferences in the user data and pathways resolution processes in the assistance data; and sorting the list of pathways based on the user data and the assistance data, wherein the second electronic communication pathway is listed in the list of pathways, wherein the data object is transferred based on a selection of the second electronic communication pathway from the list of pathways.

* * * * *